United States Patent
Jakesch

[11] 3,967,727
[45] July 6, 1976

[54] FASTENER PACKAGE

[75] Inventor: Rudolf Jakesch, Hallstahammar, Sweden

[73] Assignee: Bulten-Kanthal Aktiebolag, Sweden

[22] Filed: Aug. 28, 1974

[21] Appl. No.: 501,050

Related U.S. Application Data

[63] Continuation-in-part of Ser. No. 433,566, Jan. 15, 1974, abandoned.

[30] Foreign Application Priority Data

Feb. 7, 1973  Sweden .............................. 7301678

[52] U.S. Cl. .................................. 206/344; 206/819
[51] Int. Cl.² ........................................ B65D 85/24
[58] Field of Search ........................... 206/343–347, 206/497, 338, 437, 443, 820; 229/DIG. 12; 227/136

[56] References Cited
UNITED STATES PATENTS

| | | | |
|---|---|---|---|
| 2,982,595 | 5/1961 | Rogers, Jr. ...................... | 206/345 X |
| 3,067,424 | 12/1962 | Decot et al. ....................... | 206/344 |
| 3,357,761 | 12/1967 | Langas et al. .................... | 206/344 X |
| 3,554,246 | 1/1971 | Halstead ......................... | 206/345 X |
| 3,625,352 | 12/1971 | Perkins ............................. | 206/344 |

FOREIGN PATENTS OR APPLICATIONS

907,394  6/1945  France .............................. 206/437

*Primary Examiner*—Steven E. Lipman
*Attorney, Agent, or Firm*—Hill, Gross, Simpson, Van Santen, Steadman, Chiara & Simpson

[57] ABSTRACT

A bundle of fasteners, such as screws, are held in parallel relation between two strips. One of the strips is substantially planar and the second strip is connected against the planar strip so as to partially encase the individual fasteners therebetween. The second strip is formed of an elastic material capable of stretching to the configuration of the individual fasteners. The package retains the accuracy of positioning of the individual fasteners. A layer of plastic material makes the bundle moisture resistant and avoids leaving any residue from the strips on the work.

4 Claims, 6 Drawing Figures

FASTENER PACKAGE

RELATED APPLICATION

This application is a continuation-in-part of my co-pending application, Ser. No. 433,566, filed Jan. 15, 1974, and now abandoned.

BACKGROUND OF THE INVENTION

1. FIELD OF THE INVENTION

This invention relates to a bundle of fasteners for use in a fastener applicator apparatus.

2. PRIOR ART

In prior known fastener bundles, one or more of the following problems, presented in random order, have been encountered: (1) excessive complexity of structure and hence cost; (2) susceptibility to weakening of bundle due to humidity and other moisture; (3) fastener heads and shanks have left bundle debris on the workpiece and on the work areas, such debris frequently constituting dry glue, paper fibers, and brittle plastic material; (4) bundle debris has rendered an applicator gun susceptible to malfunctions; (5) some fastener bundles are relatively rigid and used in clip form, thus requiring frequent reloading of the applicator gun; (6) some prior fasteners require a coating for reliable use; and/or (7) unwanted reclose of the subsequent fastener.

SUMMARY OF THE INVENTION

The fastener bundle includes a pair of flexible strips, such as of paper, one of which has the yieldability property of crepe paper along its length for yieldably holding the fasteners with a positive force. The strips preferably include a plastic layer which serves three functions, namely joining the strips together between fasteners, as a means for precluding deposit of objectionable debris, and as a protector against moisture damage.

Thus, the primary object of the present invention has been to provide a fastener package of the above mentioned type wherein the enumerated problems are avoided.

ON THE DRAWINGS

AS SHOWN ON THE DRAWINGS

Figure 1:
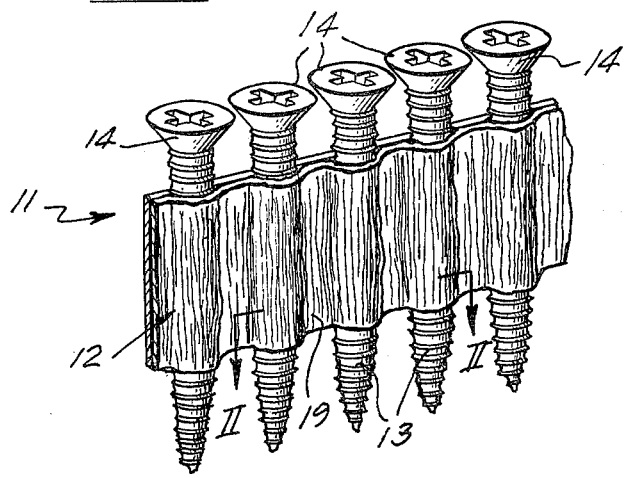
FIG. 1 is a perspective view of a fragmentary portion of a bundle of fasteners provided in accordance with the invention.

The principles of the present invention are particularly useful when embodied in a bundle of fasteners as shown fragmentarily in FIG. 1, generally indicated by the numeral 10. The bundle 10 includes a substantially planar strip of flexible sheet material 11, and a strip of flexible material 12, shown as having undulations. The strip 11 is relatively rigid but can be rolled up and comprises tough paper or cardboard, while other materials such as a plastic strip can be used. If desired, either strip can be formed as two or more strips. The material of the strip 12 is yieldable in the direction of its length and preferably comprises a form of crepe paper described more fully below.

The bundle 10 includes a series of fasteners 13, 13, which in this example comprise screws, each of which has a head or frustoconical portion 14. The screws 13 illustrated are of the self-tapping type, such as is frequently used to affix sheets of dry-wall or other building material to structural components of either wood, aluminum or steel.

Figure 4:
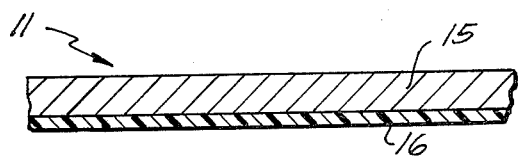

As shown in FIG. 4, the strip 11 comprises a paper layer 15 and a superficial layer 16 of heat-sealable material, namely a film of thermoplastic material.

Figure 3:
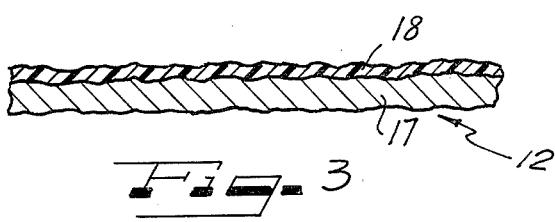
FIGS. 3 and 4 are enlarged cross-sectional views of the strips.

As shown in FIG. 3, the strip 12 comprises a layer of crepe paper 17 having a superficial layer 18 of a heat-sealable material, namely a film of thermoplastic material which follows the surface irregularities of the crepe paper.

Although crepe paper is preferred, other materials can be substituted which have the necessary physical properties, such as its elongation properties, among which are compressed paper of the Clupak type (registered trademark), and certain plastic materials of which heat-shrinkable materials are representative.

Based on evaluations to date, the strip 12 should be made of paper which is capable of an elongation of at least 25 percent without rupture, and preferably in the range of 30 to 35 percent.

To fabricate the bundle 10, the fasteners 13,13 are accurately held in parallel relationship to each other with a spacing therebetween which is uniform, the magnitude of which is determined by the parameters of the applicator gun, and the diameter of the screw head.

The strip 11 is applied to one side of the fasteners 13,13 with its length extending transversely to the length of the screws 13.

The yieldable flexible strip 12 is applied to the opposite side of the screw 13, and a suitably heated bar (not shown) urges the strips 11, 12 together between each adjacent pair of screws 13 to join the strips 11, 12 at a zone 19, with the strip 12 tensioned slightly, between adjacent zones 19.

When the bundle 10 has been inserted in an appropriate applicator gun, and the gun is operated, an element (not shown) engages the head of the screw 13 in registration therewith to urge the same in an axial direction. This movement continues, along with rotation of the screw until the frustoconical portion 14 enters the convolution in the strip 12 in which the screw 13 is located. The frustoconical portion acts in a wedging manner on such convolution of the strip 12 and causes it to yield in effective size, progressively from the one end of the convolution to the other, by an amount sufficient to pass such frustoconical portion or head therethrough. This action unjoins the leading zone 19 and only partially disjoins the zone 19 which follows.

The strip 12 which is yieldable in the direction of its length thus holds the screw 13 accurately in place against the other strip 11. During the formation of the joint therebetween, the yieldable strip 12 is stretched slightly along its length so that the strip 12 applies a positive holding force against the screw 13, there being a slight tension in the convolution during such holding, and thus a positive holding force is derived from the internal forces in the strip 12.

The plastic layers 16 and 18 render the strips 11,12 resistant to the absorption of moisture in the sense that even though there may be some moisture absorption, the bundle 10 retains its strength necessary for handling and for automatic feeding. Further, the layers 16 and 18 seal any fragments such as paper fibers so that the same or any other debris does not become lodged under the head of the fastener.

Figure 5:
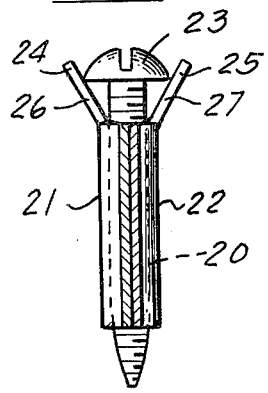
FIGS. 5 and 6 are cross-sectional and plan views of a modified form of the invention.
Figure 2:
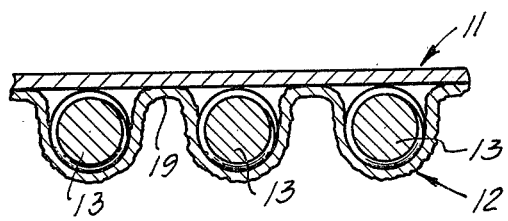
FIG. 2 is an enlarged cross-sectional view taken along line II—II of FIG. 1.
Figure 6:
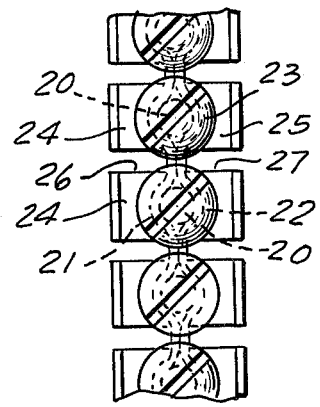

A modified form of the invention is shown in FIGS. 5 and 6. In this embodiment, a fastener 20 is disposed between a pair of strips 21,22 and corresponds largely to the fastener 13 and the strips 11 and 12. In this embodiment the frustoconical portion 14 is omitted, and the fastener 20 is provided with a head 23 which has a flat lower surface which is received by and between a pair of outwardly flaring flanges 24,25 disposed at the upper edges of the strips 21,22 to provide guides to enable the heads 23 to enter the convolution. The flange 24 is slotted as at 26 and flange 25 is slotted as at 27 to enable coiling of the bundle.

Although various minor modifications might be made or suggested by those versed in the art, it should be understood that I wish to embody within the scope of the patent warranted hereon, all such embodiments as reasonably and properly come within the scope of my contribution to the art.

I claim as my invention:

1. A bundle of fasteners, comprising in combination:
 a. a series of headed fasteners arranged in substantially parallel relation to each other; and
 b. a pair of strips of flexible material disposed at and non-adhesively engaging opposite sides of said fasteners, at least one of said strips comprising material that is yieldable in the direction of its length, said strips being joined together between adjacent fasteners such that such yieldable strip is positively held against said fasteners with a force derived from its having yielded, the marginal portions of said strips adjacent the heads of said fasteners being outwardly flaring flanges to provide guides for the passage of the fastener heads.

2. A bundle of fasteners, comprising in combination:
 a. a series of headed fasteners arranged in substantially parallel relation to each other; and
 b. a pair of strips of flexible material disposed at and non-adhesively engaging the opposite sides of said fasteners, at least one of said strips comprising crepe paper that is yieldable in the direction of its length, said one strip having a flexible layer of plastics material which follows the inherent surface irregularities of said crepe paper, said strips being joined together between adjacent fasteners such that such yieldable strip is positively held against said fasteners with a force derived from its having yielded.

3. A bundle of fasteners according to claim 2 in which said fasteners comprise screws.

4. A bundle of fasteners according to claim 2 in which each said fastener has a frusto-conical portion receptive, during discharge, between said strips to further elongate the adjacent portion of said yieldable strip.

* * * * *